United States Patent [19]

Dussan V. Benlcio I.

[11] Patent Number: 4,674,627

[45] Date of Patent: Jun. 23, 1987

[54] SANITARY CONVEYOR ASSEMBLY

[75] Inventor: Dussan V. Benlcio I., Philadelphia, Pa.

[73] Assignee: Proctor & Schwartz, Inc., Horsham, Pa.

[21] Appl. No.: 669,923

[22] Filed: Nov. 8, 1984

[51] Int. Cl.[4] .................... B65G 15/40; B65G 39/20
[52] U.S. Cl. .................................. 198/821; 198/845; 198/846
[58] Field of Search .............. 198/821, 820, 845, 844, 198/846, 849

[56] References Cited

U.S. PATENT DOCUMENTS

| 2,019,389 | 10/1935 | Bogaty | 198/845 |
| 2,732,631 | 3/1968 | Blank | 107/54 |
| 2,746,171 | 5/1956 | Fleming | 34/233 |
| 2,946,428 | 7/1960 | Baker | 198/846 |
| 2,998,121 | 8/1961 | Gilbert | 198/823 |
| 3,220,535 | 11/1965 | Franklin et al. | 198/845 |
| 3,279,588 | 10/1966 | Andrews | 198/820 |
| 3,331,490 | 7/1967 | Daniels | 198/822 |
| 3,374,751 | 3/1968 | Werner | 107/54 |
| 4,067,318 | 1/1978 | Flaith et al. | 34/208 |
| 4,109,784 | 8/1978 | Hartmann | 198/821 |

FOREIGN PATENT DOCUMENTS 1030250 5/1958 Fed. Rep. of Germany ...... 198/845

Primary Examiner—Frank E. Werner
Assistant Examiner—Lyle Kimms
Attorney, Agent, or Firm—Richard H. Thomas

[57] ABSTRACT

An easily-cleaned, rubberized conveyor assembly especially adapted for conveying granular or semi-fluid material. The present invention is particularly concerned with conveying food materials where cleaning and sanitary conditions are important. The invention is also particularly described with regard to a conveyor for the bottom of a holding or surge bin, but has other applications. In the invention, upright side guards along opposite sides of a continuous rubberized belt separate the belt into a central load-carrying portion and outer edge aligned portions. Connections connect the edge aligned portions to supporting girts beneath the belt, the girts in turn being attached to endless conveyor chains on opposite sides of the belt. Preferably, the side guards are rubberized elements vulcanized to the belt surface, thereby providing an assembly having a load-carrying area free of cracks or crevices.

9 Claims, 3 Drawing Figures

SANITARY CONVEYOR ASSEMBLY

TECHNICAL FIELD

The present invention relates to an easily cleaned, rubberized conveyor assembly especially adapted for conveying granular or semi-fluid material. The present invention will be particularly described with regard to conveying food materials, where cleaning and sanitary conditions are important, but it will be apparent to those skilled in the art that the present invention has other applications where cleanliness or ease of cleaning is important, for instance in the transport of different chemicals utilizing a single apparatus. The present invention also will be particularly described with regard to a conveyor means for the bottom of a holding or surge bin, although again, it will be apparent to those skilled in the art that the present invention has other applications.

BACKGROUND OF THE INVENTION

The food items of particular interest in the present invention are very heavy, dense materials such as intermediate, wet, cereal products prior to drying or other treatment such as puffing. The consistency of the products may be similar to that of oatmeal.

The type of apparatus of particular interest, in the present invention, is a holding or surge apparatus in the shape of a rectangular bin having a travelling conveyor or transport means forming the bottom of the bin to unload the same. One purpose of such holding or surge apparatus is to achieve tempering or equilibration of the product held in the bin. This comprises holding the product for a sufficient period of time to allow moisture migration from product of high moisture content to product of low moisture content to achieve moisture uniformity throughout the product.

Accordingly, the bin may be filled to a substantial depth, creating a heavy load on the transport or conveyor means forming the bottom of the bin. It is an object of the present invention to carry out the transport of product from the bed with as little frictional resistance as possible.

Another object of the present invention is to provide endless transport or conveyor means for the product in question which can be readily cleaned prior to recycle of any portion of said transport or conveyor means through the bin, e.g., the equilibration or tempering zone.

Prior U.S. Pat. No. 2,732,631, to Harold G. Black, assigned to assignee of the present invention, describes a conveyor-type dryer especially adapted for loose, fibrous or granular material comprising an endless conveyor having laterally spaced side chains supported on parallel side tracks for horizontal movement through a dryer. The conveyor is provided with vertical side guards disposed inwardly of the side chains, adapted to retain material on the conveyor. The side guards are in the form of a series of overlapping plates adapted to spread apart or separate to negotiate the turning radius at the conveyor end sprockets. The conveyor bed may be a foraminous support of wire mesh or perforated plates.

In the conveyor system of the U.S. Pat. No. 2,732,631 it is possible, even if the bed was of an air-impervious material, for product being conveyed to flow into cracks between the separate side plates and between the plates and conveyor bed, making it difficult to easily clean the conveyor. This is particularly the case when the material being conveyed is heavy, wet, material such as an intermediate cereal product.

It is also known to construct a conveyor bed of a rubberized belt material, and to run the belt between a pair of stationary parallel-spaced walls adapted to form the belt into a transitory trough. This is shown, by way of example, in prior U.S. Pat. No. 2,998,121 to N. W. Gilbert. Conventionally, the trough-forming means is adapted to simply bend the rubberized belt into a "U" shape. However, as noted in the U.S. Pat. No. 2,998,121, material can flow over the sides of such belts, creating a sanitary problem. This problem is purported to be solved in the U.S. Pat. No. 2,998,121 by providing longitudinally-extending hinge lines along the sides of the belt so as to permit forming the belt into a flattened-bottom shape, with vertical upstanding sides. However, in the apparatus of the U.S. Pat. No. 2,998,121, the problem exists, with heavy loads, that high frictional resistance is created between the belt sides and the forming means, particularly with heavy loads and a belt of substantial length. The high friction, in turn, has such adverse affects as high belt stress and traction problems at the drive roll.

In the U.S. Pat. No. 2,998,121, the central load carrying portion is supported by a plurality of spaced rollers, but under high loads, there is a tendency of the belt to form a catenary between the rolls, resulting in such difficulties as sealing the belt edges against the flow of material from the bed.

In prior U.S. Pat. No. 3,374,751 to C. R. Werner, the problem of frictional load resistance, with a moving, rubberized belt, is said to be overcome by introducing air into the space between the belt member and forming means for the belt. Such an apparatus is expensive to build and operate, and is not likely to function well with high loads.

Examples of other prior art conveying systems are contained in prior U.S. Pat. Nos. 2,746,171 to Fleming; 3,220,535 to Franklin et al; 3,331,490 to Daniels et al; and 4,067,318 to Flaith et al. All but the Daniels et al patent are assigned to assignee of the present invention. Also, it is known to vulcanize upstanding, vertical guards onto a flat rubber belt, to form a permanent configuration similar in cross-section to that of the U.S. Pat. No. 2,998,121 belt. However, conventionally, such belts are used for the transport of relatively light loads of material and are supported by a series of spaced rolls, or by a stationary bed on which the belt slides. The disadvantages of such supports were outlined above.

DISCLOSURE OF INVENTION

The present invention constitutes an improvement over the prior art in the provision of an easily-cleaned and low-friction, closed-path conveyor assembly, especially adapted for conveying heavy loads; comprising an elongated, endless, flexible, rubberized belt; longitudinally extending chain means on opposite sides of said belt; a plurality of spaced-apart girts extending laterally beneath the rubberized belt supported by opposed elements of said chain means, said girts being sufficiently closely spaced to maintain said belt in a substantially flat configuration; continuous longitudinally extending, upstanding, vertical side guards along opposite sides of said belt but inside of the belt edges to define a central belt, load carrying portion and outer belt edge-aligned portions; and means connecting said outer edge-aligned portions to said girts.

In a preferred embodiment, the upstanding, vertical side guards are rubberized elements vulcanized to the surface of said belt.

It is also a preferred embodiment of the present invention that the vertical side guards are corrugated in horizontal cross section to facilitate movement of the belt around the conveyor assembly end sprockets.

BRIEF DESCRIPTION OF DRAWINGS

The present invention, and advantages thereof, will become more apparent upon consideration of the following specification, with reference to the accompanying drawings, in which.

Figure 1:
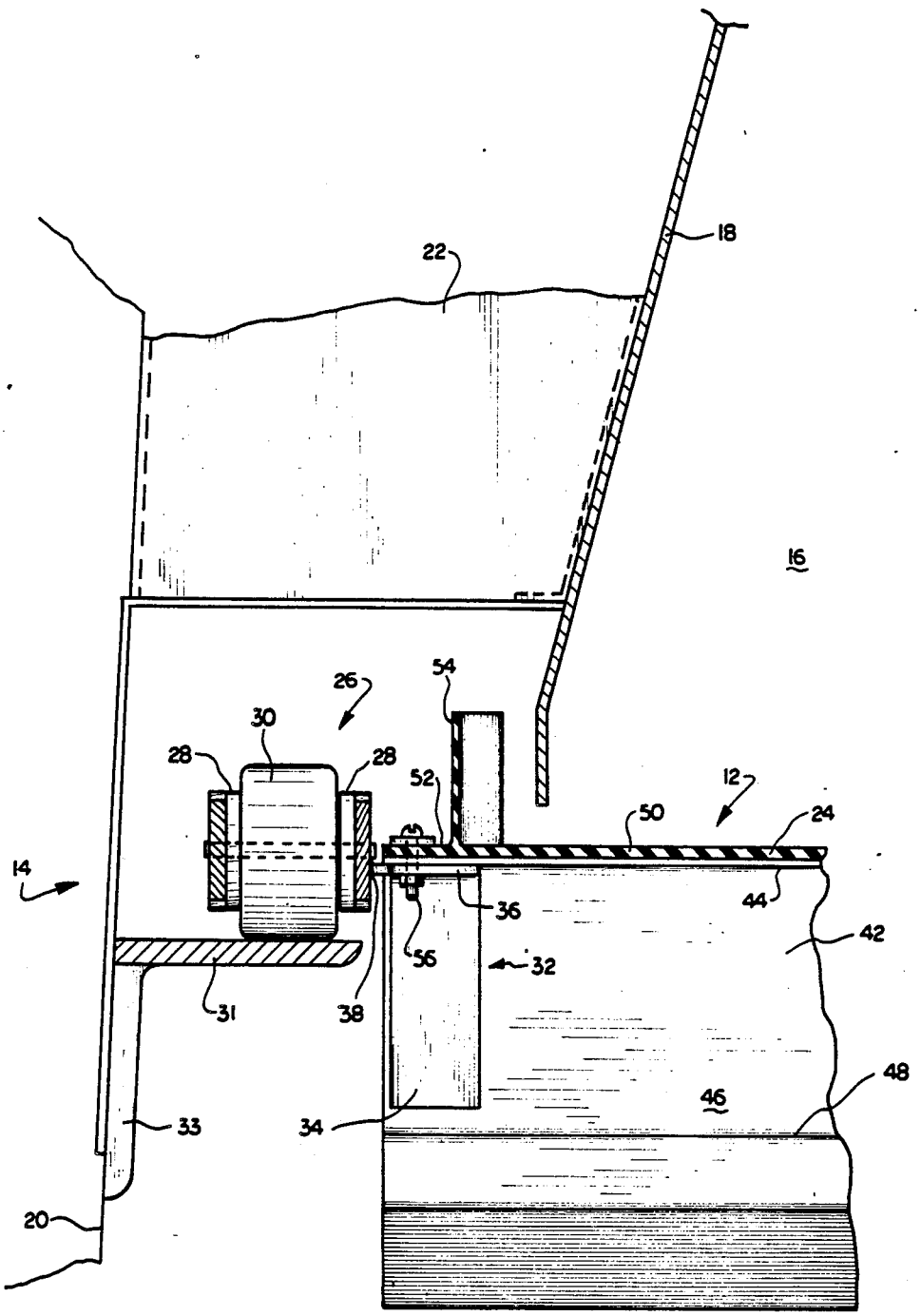
FIG. 1 is a vertical section view of a surge or holding bin and conveyor assembly in accordance with the concepts of the present invention.

Referring to the drawings, the conveyor assembly of the present invention is generally designated with the numeral 12. It is supported within a housing generally designated with a numeral 14. The housing may be a dryer, cooler, or other treatment apparatus, but in this instance it is a surge or holding bin 16 having opposed sides 18 which extend upwardly and inwardly, narrowing at the top. In the figures, only one side of the bin and conveyor assembly of the present invention is shown, and it will be apparent that the opposite side of the bin and assembly will be the same as that illustrated, but a mirror image.

With reference to FIG. 1, a support element 20 maintains the bin elevated from a floor or ground surface, and a plurality of successive flanges 22 connect the sides 18 to the support. The bin sides form a generally rectangular, open top, configuration with the conveyor assembly 12 making up the bottom or floor of the bin. In operation, the bin is usually loaded by means positioned above the bin, not shown, adapted to lay down material on the bottom or floor in a bulk or layer form of several feet in depth. The conveyor assembly 12 is then utilized to unload the bin.

The conveyor assembly comprises an endless rubberized belt 24 extending the full length of the bin, adapted to pass in a return run (also not shown) beneath the bin, and a pair of side chains broadly designated with the numeral 26. Each chain comprises links 28, 28' 28'', shown in FIG. 2, overlapping one another with rollers 30, 30' being connected together by the successive chain links. As shown in FIG. 1, coacting links are positioned on opposite sides of the rollers. The rollers ride on horizontal tracks 31 supported by members 33 (FIG. 1) fastened to the supports 20 for the surge bin adapted to provide substantially horizontal flat runs for the rollers.

The chains follow a similar endless path as the rubberized belt 24, turning around pairs of end sprockets positioned at opposite ends of the surge or hold bins.

Figure 2:
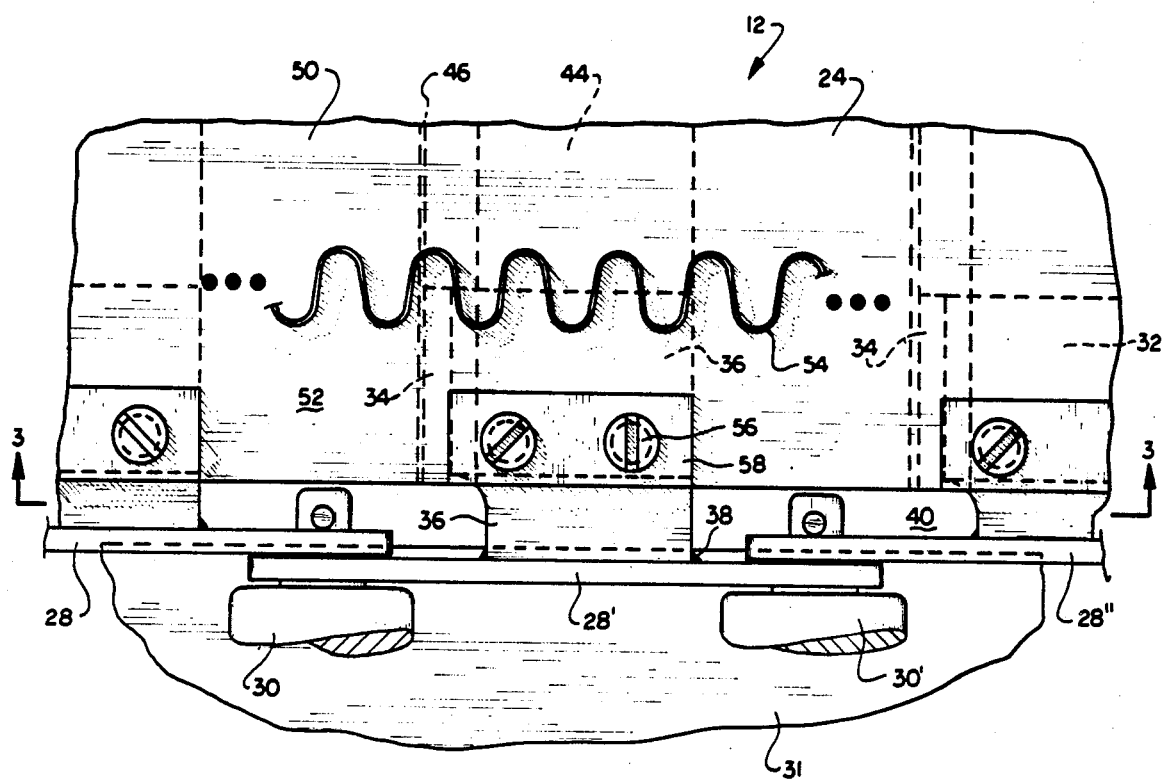
FIG. 2 is an enlarged, top view of the bin conveyor assembly of FIG. 1.

To fasten the conveyor belt 24 to the side chains, the assembly is provided with ell-shaped brackets 32 welded to successive inner links 28, 28', 28'' of the conveyor chain. As shown in FIG. 1, the brackets 32 have a downwardly extending leg portion 34 and a horizontally extending leg portion 36, the latter being welded along its edge 38 (FIG. 2) to the links 28, 28' 28''. The horizontal legs 36 are slightly cut away at 40, as shown in FIG. 2, to provide clearance for the chains at the assembly end sprockets.

Figure 3:
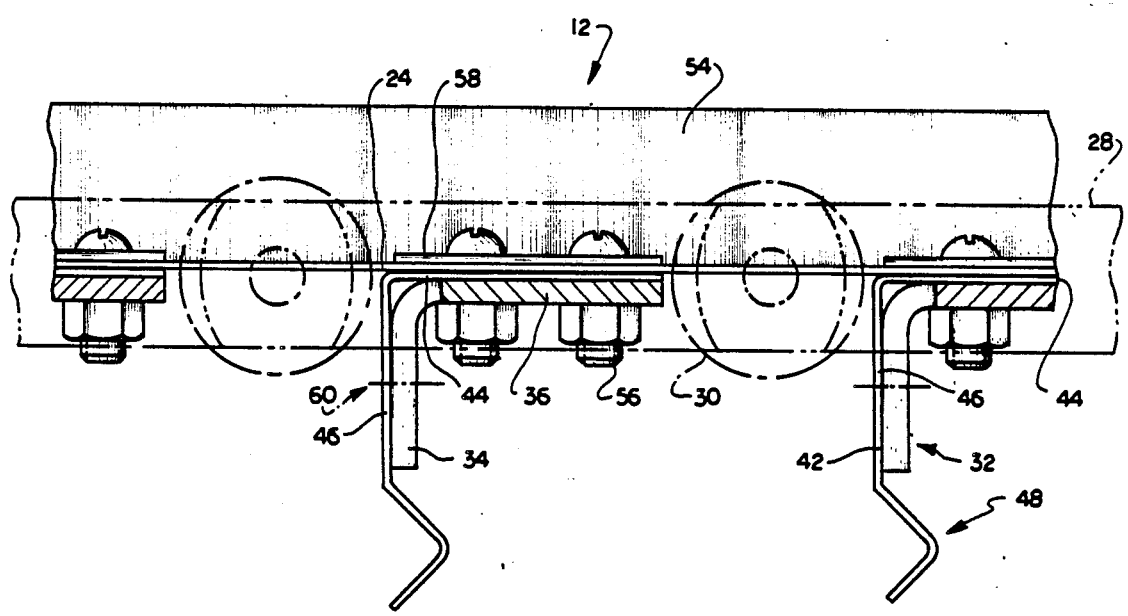
FIG. 3 is a section view taken along line 3—3 of FIG. 2.

Attached to the brackets 32 are ell-shaped girts 42, (FIG. 1) which extend laterally across substantially the full width of the conveyor assembly between the chains 26. These girts are shown in FIGS. 1 and 3 in detail, and comprise a horizontal leg 44 seated on the horizontal legs 36 of the brackets and a downwardly extending leg 46, the leg 46 being convoluted at 48 to add additional strength to the girt, or resistance to bending, either in a vertical or horizontal direction.

The rubberized belt 24, as with the girts 42, extends substantially fully across the width of the assembly, spanning the distance between the chains, and comprises a main, central, load-carrying portion 50, and opposite longitudinally extending side or edge portions 52, separated by vertically extending side guards 54 vulcanized or similarly integrally fastened to the upper surface of the belt. As shown in FIG. 1, the belt is fastened to the girts by means of a plurality of spaced bolts 56 which extend through the edge portions 52 outboard of the side guards, and through the girts 44 and bracket horizontal legs 36, holding all of these elements together in a rigid, fastened relationship by means of nuts threaded onto the bolts. As shown in FIG. 2, a pair of bolts is utilized with each bracket horizontal leg 36. Shims 58 are positioned between the belt 24 and bolt heads.

In addition to bolts 56, the girt downwardly extending legs 46 can be securely bolted (or welded) to downwardly extending legs 34 of the brackets 32. In FIG. 3, the use of bolts is shown schematically with dashed lines 60. A plurality of bolts, e.g., three, gives substantial added rigidity to the assembly.

In a preferred embodiment, illustrated in the drawings, the side guards are provided with a convoluted configuration (notice FIG. 2), which makes the guards expandable longitudinally, facilitating movement around the conveyor end sprockets. Whether or not the vertical or upstanding side guards should be convoluted or not, depends upon the height of the guards, and their material of construction, which, in turn, depends upon particular application. The length, width and height of all of the elements can also be varied to accommodate specific needs. By way of example, using end sprockets about 10½ inches in diameter, convoluted side guards about one to one-and-one-half inches in height can readily negotiate the constrained path of travel. In this example, the spacing or pitch between rollers may be about 4 inches and the length of the horizontal leg of the ell-shaped flange supporting the girts may be about 2 inches. The spacing between the girts is the same as that between the rollers - about 4 inches. Each girt may be about 2-3 inches in height. The conveyor belt in this example may be about 1/16 inches in thickness. Again, all dimensions, the chain pitch and girt configuration can be varied for specific applications.

The type of material used for the conveyor belt can also be any of a number of commercially available materials, one example being a strong, food grade, polyvinyl chloride, with a polyester backing.

The side guards could also be made of a strong, food grade polyvinylchloride.

Advantages of the present invention should by now be apparent. A principle advantage is ease of cleaning the conveyor assembly. While within the surge bin, the conveyor assembly can be piled with material up to several, e.g., 3-4 feet in height, without the danger of material spilling over the top edges of the side guard. The reason for this is that the side guards pass sufficiently close to the sides 18 of the bin to prevent the passage of material upwardly in this area, so that the material being transported remains essentially on the product-carrying surface 50. By positioning the fastening means (bolt 56) outside of the sideguards, and vulcanizing or similarly integrally fastening the side guards to the belt, there are no crevices or cracks or joints into which food product can flow.

In addition, the rubberized belt 24 is fully supported by the skeleton-type girted conveyor, which also provides and transmits the traction required to move the system, eliminating inherent tensive stresses of conventional rubberized-type conveyors.

Although the present invention has been described in part with reference to the transport of wet, intermediate cereal products, it should be apparent to those skilled in the art that it can be employed with equal facility with dryer, lighter weight finished cereal products.

I claim:

1. An easily-cleaned, sanitary closed path conveyor system especially adapted for food uses comprising:
   (1) an elongated, endless, flexible, impervious rubberized belt;
   (2) longitudinally extending chain means on opposite sides of the belt;
   (3) a plurality of spaced-apart girts extending laterally beneath the rubberized belt supported by opposed elements of said chain means, said girts having a wide flattened upper surface and being sufficiently closely spaced to provide a supporting area effective to maintain said belt in a substantially flat configuration;
   (4) continuous longitudinally-extending upstanding side guards along opposite sides of said belt, but inside of the belt edges to define a centered product-carrying surface and outer edge aligned surfaces, said side guards being integrally fastened to said belt so as to be free of crevices between the belt and side guards; and
   (5) securing means fixedly securing said outer edge aligned surfaces of said belt to each of said girts, said securing means being the sole connection of the belt to the girts.

2. The conveyor system of claim 1 wherein said upstanding side guards are rubberized elements vulcanized to said belt.

3. The conveyor system of claim 2 wherein said upstanding side guards define in horizontal cross-section a convoluted configuration.

4. The conveyor system of any of claims 1, 2 or 3 for the transport of food cereal products.

5. The conveyor system of claim 1 wherein said chain means comprises rollers and links connecting the rollers, said girts being supported by successive chain links.

6. A surge or holding bin especially for food uses comprising:
   (1) sides defining a substantially rectangular, open-topped configuration and having interior and exterior surfaces;
   (2) an easily-cleaned, sanitary, closed-path conveyor system defining a bottom of said bin;
   (3) track means along two opposite of the bin sides;
   (4) said conveyor system comprising
      (a) an elongated, longitudinally extending endless, flexible, impervious rubberized belt;
      (b) longitudinally extending chain means adapted to travel on said track means, said belt spanning essentially the full distance between said chain means;
      (c) a plurality of spaced-apart girts extending laterally beneath the rubberized belt supported by opposed elements of said chain means, said girts having a wide flattened upper surface and being sufficiently closely spaced to provide a supporting area
   effective to maintain said belt in a substantially flat configuration;
      (d) continuous longitudinally-extending upstanding side guards along opposite sides of said belt, but inside of the belt edges to define a centered product-carrying surface and outer edge aligned surfaces, said side guards being integrally fastened to said belt so as to be free of crevices between the belt and side guards and projecting upwardly above the lower edges of and along the exterior surfaces of the respective of said two opposite bin sides; and
      (e) securing means fixedly securing said outer edge aligned surface of said belt to each of said girts, said securing means being the sole connection of the belt to the girts.

7. The surge or holding bin of claim 6 wherein said upstanding side guards are rubberized elements vulcanized to said belt.

8. The surge or holding bin of claim 7 wherein said upstanding side guards define in horizontal cross-section a convoluted configuration.

9. The surge or holding bin of any of claims 6, 7, or 8 for the transport of food cereal products.

* * * * *